United States Patent [19]

Sandvoss et al.

[11] Patent Number: 5,745,380
[45] Date of Patent: Apr. 28, 1998

[54] PRIORITY CONTROLLED TRANSMISSION OF MULTIMEDIA STREAMS VIA A TELECOMMUNICATION LINE

[75] Inventors: Jochen Sandvoss, Mannheim; Boris Kownatzki, Berlin, both of Germany

[73] Assignee: International Business Machines Corporation, Armonk, N.Y.

[21] Appl. No.: 468,175

[22] Filed: Jun. 6, 1995

[30] Foreign Application Priority Data

Jan. 30, 1995 [EP] European Pat. Off. ............ 95101214

[51] Int. Cl.$^6$ ................................................ G06K 15/00
[52] U.S. Cl. ................................................ 364/514 R
[58] Field of Search ............... 364/514 A, 514 R, 364/554; 370/79, 80, 85.6, 433, 437, 455, 465; 340/825.5, 825.51; 379/202, 243, 250, 258

[56] References Cited

U.S. PATENT DOCUMENTS

| | | | |
|---|---|---|---|
| 4,930,017 | 5/1990 | Izawa | 358/296 |
| 5,121,385 | 6/1992 | Tominaga et al. | 370/80 |
| 5,392,223 | 2/1995 | Caci | 364/514 |
| 5,434,797 | 7/1995 | Barris | 364/514 A |
| 5,434,920 | 7/1995 | Cox et al. | 380/49 |
| 5,546,324 | 8/1996 | Palmer et al. | 364/514 R |

FOREIGN PATENT DOCUMENTS 8303512  2/1983  European Pat. Off. .

OTHER PUBLICATIONS

Sabri et al. "Video Conferencing Systems", IEEE, vol. 73, No. 4, 1985.

*Primary Examiner*—Hassan Kizuo
*Assistant Examiner*—Kwang Bin Yao
*Attorney, Agent, or Firm*—Douglas W. Cameron

[57] ABSTRACT

Disclosed are a method, a system and a device for the transmission of multimedia streams via telecommunication lines. Especially, the disclosure relates to information transfer in video or audio teleconferences. The invention provides a scale of priorities for active transmission of the streams, wherein the priority status of each stream is changed dynamically with respect of attributes of substreams of the multimedia streams. Only the streams with the highest priority levels are actively transmitted.

8 Claims, 4 Drawing Sheets

PRIORITY CONTROLLED TRANSMISSION OF MULTIMEDIA STREAMS VIA A TELECOMMUNICATION LINE

TECHNICAL FIELD

The present invention generally relates to a method for the transmission of multimedia streams via a telecommunication line of a given bandwidth which for example can be an analog or a digital phone line, a satellite link or a communication network, etc. Each multimedia stream comprises at least two substreams, e.g. video, audio and/or data streams. The invention further relates to a speech controlled video conferencing system employing the above method and a speech controlled data transfer device which allows for a bandwidth sharing of a single telecommunication line between speech and data streams.

DESCRIPTION OF THE PRIOR ART

In video or audio teleconferences with multiple participants taking part simultaneously, these users are over flooded with video, audio and data, i.e. multimedia information sent by their conference partners.

Further the costs of conferencing systems grow exponentially with the number of participants. The reason is the increase in the system resources required to handle those multimedia streams and for the management of those streams. Besides cost, most of the currently available workstations lack the capacity to handle more than a few (3 or 4) video and audio streams, even if they are in compressed format, e.g. MPEG or DVI.

Thereupon, from a users point of view it is very difficult to find the information he is really interested in when communicating with more than just a few participants. In prior art conference systems, the participants have to interact with their system in order to get the relevant video information each time the main speaker of a conference changes. A group of n participants communicating gets n videostreams, e.g. one video window for each partner.

As a result, known solutions for controlling generic conferences are designed for handling only small groups of participants per conference. In addition, the control of those systems requires a lot of human interaction. The solution used in most current conferencing systems is a mechanism that allows for an explicit selection by the users directly or by a dedicated person using a master station. These systems lack of user friendliness and are characterized by inefficient usage of system resources. The user on the receiver site has to select the relevant information by trying to find the right video window, shared application etc.

More advanced techniques are token protocols which ensure that only one participant of the conference is enabled to send data. Users who want to talk to their partners participating the conference have to ask for a token. Disadvantages of those systems are the control on which the user gets the token at what time and the restriction that only one user is allowed to send even if there is a dialog between more participants.

An already known solution for controlling the transmission of pure audio information is the use of a silence detection mechanism. This technique is used in order to reduce the data rate in case of audio signals by stopping the audio data transmission if the user is not speaking. Using that mechanism, audio information is only generated and transmitted if there is any amplitude in the audio signal. In time periods without any audio signal or a signal near "floor noise" no data is transmitted.

European Patent Application 0 171 596 discloses a method and an apparatus for concentrating signaling and non-signaling messages over a single telecommunication line. The information from each of the users is first buffered, the buffered information prioritized in accordance with a predetermined fixed priority scheme and thereafter the buffered information is transferred to the common telecommunication line based upon the classification of the information within the priority scheme. Thus information with the highest priority is transmitted first on the common line followed by information with lower priority. All messages entering a queue are assigned to one of five priority classes. The method allows for an integration of supervisory signaling functions with normal message traffic whereby freeing any residual signaling capacity for use by the normal message traffic. This technique increases the effective capacity of the communication line.

Further European Patent Application 0 459 563 discloses an audio teleconferencing system. The intensities of speech of all the participants of a conference call are detected. A participant whose intensity exceeds a given threshold is set into an active status for the transmission of speech. For the determination of an active status not the absolute signal amplitudes are taken into account, but also the intensities of the other participants. Herethrough it is advantageously achieved that in case of low noise conference conditions also a participant with even a low speech signal amplitude can be set active.

Therefore, the underlying problem of the present invention is to get a generic method for the transmission of multimedia streams, especially a conferencing system, which allows For a cost reduction whereby comprising user friendliness insofar as in a conference a user can find the relevant information without the necessity of any interaction with the conferencing system.

SUMMARY OF THE INVENTION

This problem is solved by the method of the present invention according to the features of claim 1, wherein at least one kind of substreams of the multimedia streams comprise an attribute controlling the priority for active transmission of one or more streams in respect of the other streams, wherein continuously detecting changes of the attributes of those substreams, wherein providing a scale of priorities for the active transmission of streams, wherein dynamically changing the priority status of each stream according to the change of at least one attribute and wherein actively transmitting only the stream(s) with the highest priority level(s).

The background of the proposed solution is the observation that participants of video conferences normally are only interested in getting video and data information from the current speaker(s) but only very seldom from the rest of the group. In the new approach at least two competitive unidirectional multimedia streams are transmitted, each multimedia stream comprising a bundle of parallel substreams i.e. digital or analog signals, for example audio, video, mouse pointer, currently used application windows, etc. sent from a sender entity of a conferencing application to the conference partners. Via an attribute, e.g. the amplitude of the audio signals, one of these substreams is determining the transmission status (active or passive) of all the multimedia streams.

An active transmission, for example, in case of a video signal can mean that this signal is displayed on all the conferencing sites only when active or it is displayed in color instead of monocromatic black/white. Another solution can be coupling of the quality of transmission directly with the weight of a stream. In case of a video signal bad quality can be a lower resolution of the transmitted signal, in case of an audio signal lower quality can be realized by lower signal amplitude. But it is emphasized that these realizations are only embodiments of the invention and further solutions of active transmission are thinkable. According to the invention the stream(s) with the highest priority level(s) is(are) controlling the remaining streams. At a given time only a set of the most important streams is transmitted.

A reduction of system costs can be also achieved in cases where more than one speaker of a conference sit together in one room by usage of only one remote controlled video camera together with a microphone for each speaker. The camera can be moved to pre-defined views based on the weight G of the audio signal coming from the corresponding place i.e. microphone. If only one camera is available, it is always moved to the place with the loudest audio signal or to the place where the last audio signal came from.

BRIEF DESCRIPTION OF THE DRAWINGS

The basic principles of the present invention are described in more detail by the drawings which show a speech controlled data transfer modem. In particular

DESCRIPTION OF THE PREFERRED EMBODIMENT

Figure 1A:
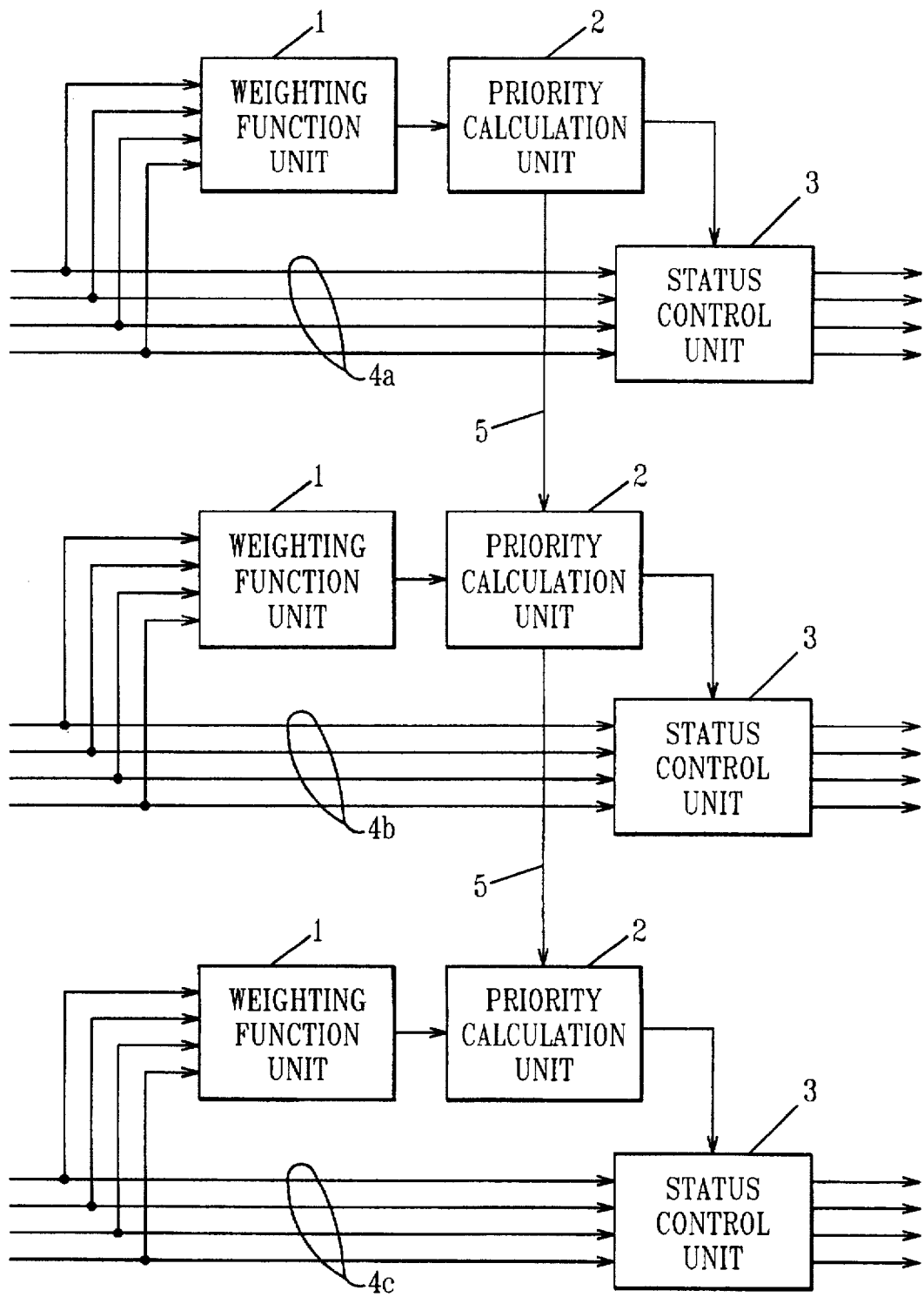
FIG. 1a shows the functional elements of an implementation of the method according to the invention.

In FIG. 1a the principle aspects of the method for the transmission of multimedia streams according to the invention are exhibited. For example, three multimedia streams 4a—c each consisting of four substreams are shown. In this preferred embodiment of the invention the substream signals are fed into a unit 1 which executes a weighting function with respect to the attributes of one kind of those signals, e.g. the amplitude of the audio signals. The weighting function delivers a signal into a unit 2 for the priority calculation. Unit 2 provides a scale of priorities for the active transmission of the streams 4a—c. An ON/Off-switch sets one or more of the streams with the highest priority(ies) in state active and all the other streams in state passive. For setting up a global scale of priorities, further messages have to be transferred between the units 2 which are responsible for the priority calculation.

Figure 1B:
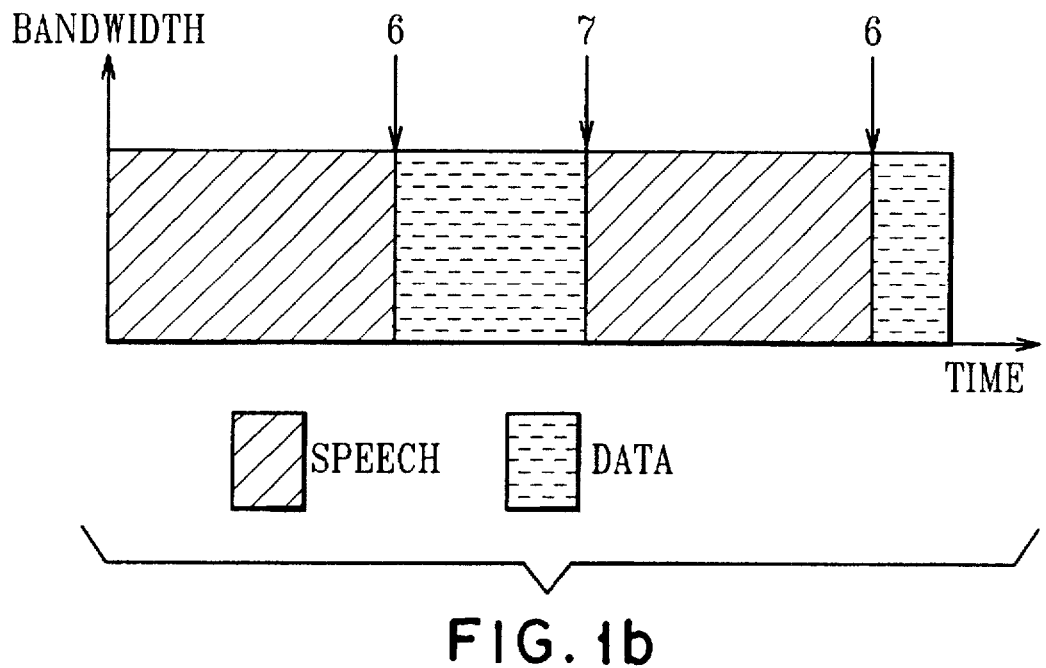
FIG. 1b shows a schematic drawing of a telecommunication line illustrating the principle aspects of bandwidth sharing.

The schematic diagram in FIG. 1b shows the bandwidth for transmission of a telecommunication line dependent from time. The whole bandwidth is shared for exclusive transfer of speech and data respectively wherein switching between speech and data is accomplished by a silence detection mechanism. When detecting the beginning of a silence of speech period 6, transmission of speech is interrupted and the telecommunication line is switched to a second transmission mode for transmitting binary data only. Transmission of speech restarts when an audio (speech) signal 7 is detected again.

Realization of a data transfer modem according to the present invention depends on the transmission properties of the underlying telecommunication network. Bandwidth sharing between speech and data can be realized under two conditions: An analog or a digital speech transmission.

Figure 2:
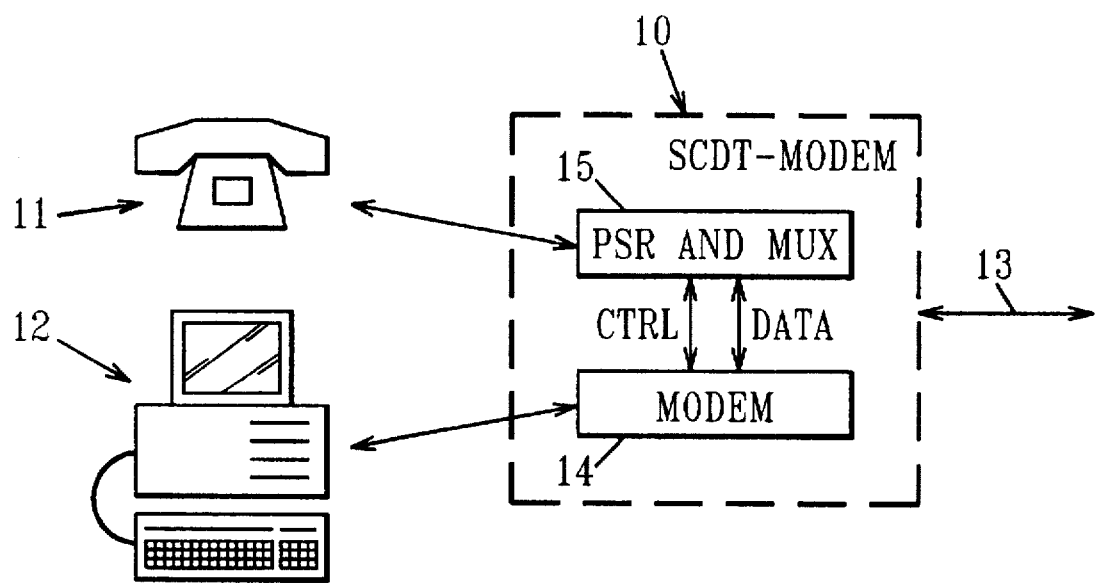
FIG. 2 shows a system overview in case of analog speech transmission according to the invention.

In FIG. 2 a first approach corresponding to analog speech transmission is shown. A speech controlled data transfer modem 10 interconnects a telephone 11 and a personal computer 12 with an analog phone line 13. The functionality of a known modem 14 is extended by adding a new hardware component 15, a Periods of Silence Recognizer and Multiplexor (PRSandMUX). The actually used communication protocols have only to be changed slightly. The PSRandMUX 15 behaves like an automatic switch connecting the telephone 11 to the telephone line 13 during speech periods and the modem 12 to the line 13 during periods of silence.

Figure 3:
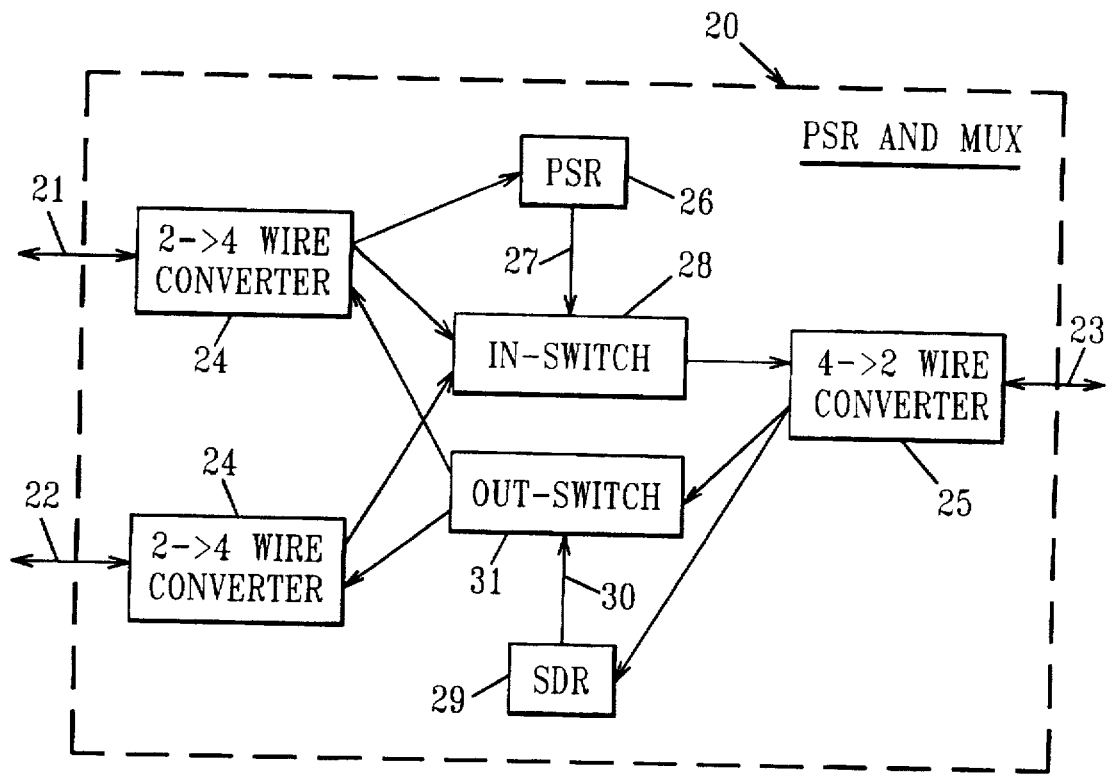
FIG. 3 shows a block diagram of a Periods of Silence Recognizer and Multiplexer according to the invention for the case of analog speech transmission.

FIG. 3 in more detail shows a preferred embodiment of the PSRandMUX 20 being connected to a telephone via port 21, to a modem via port 22, and to a telephone line via port 23. The PSRandMUX 20 comprises 2 to 4 wire converter 24 at both inputs 21, 22 for processing both communication directions separately. In accordance the PSRandMUX contains a 4 to 2 wire converter 25 at the output port 23. The audio signal received from the telephone 11 via input port 21 and converter 24 is fed into a period of silence recognition device 26 which generates a control signal 27. This signal 27 is fed into a fast In-switch 28 which connects speech received via port 21 and data received via port 22 to the phone line 23 via converter 25.

For the incoming traffic via port 23 and converter 25 a speech/data recognition device 29 is provided which delivers a control signal 30 to a fast Out-switch 31. The switch 31 connects incoming speech to port 21 via converter 24 and incoming data to port 22 via the second converter 24.

The modified modem protocol has to handle the control signals generated by the PSRandMUX 26 and to interrupt the dataflow at specified moments. However the connection of data should not be closed definitively in order to allow a fast resynchronization at the beginning of the next silent period. Switching between speech and data mode is advantageously controlled by additional signalling tones, so that protocols can differentiate carrier loss from multiplexing.

The great advantage of the above approach is a non lossy speech transmission because of the analog signal transmission. Therefore the user normally does not realize the background data transmission.

Figure 4:
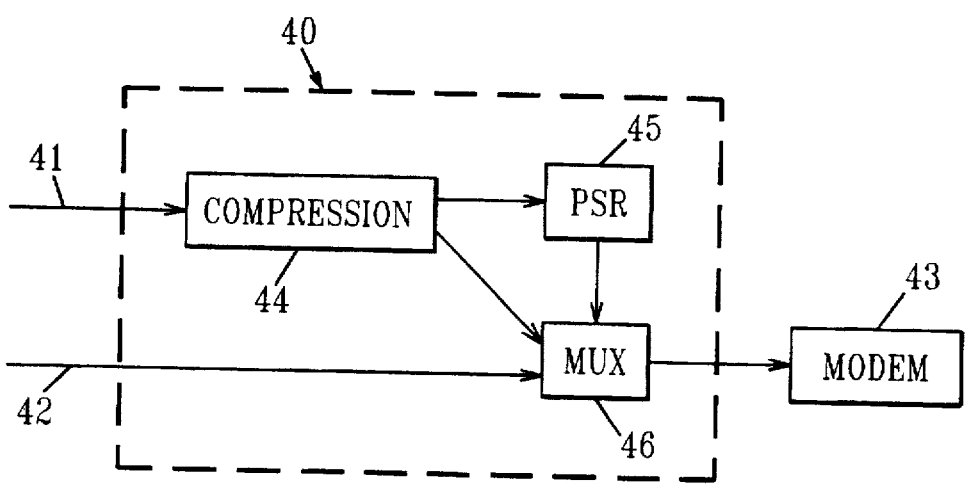
FIG. 4 shows a block diagram of a Periods of Silence Recognizer and Multiplexer on the sender site according to the invention for the case of digital speech transmission.

Another approach of the invention is based on digitized speech transmission. Digitized speech can be easily obtained by existing PC soundcards or AD/DA converters. Hereby a software or an additional PC-card 50 is supplied at the sender 40 and at the receiver site 50. FIG. 4 first shows an embodiment at the sender site comprising an input port 41 For digital speech, an input port 42 for data and an output port 43 connected to a digital link. The incoming digital speech is compressed in a unit 44 and then fed into a periods of silence recognition (PSR) unit 45 and a multiplexor 46

(MUX). Incoming data traffic via port 42 is fed directly into the multiplexor 46. In a preferred embodiment, compressing of the digitized speech and performing the PSR and digital MUX of speech and data are realized on a computer system. The consistent data stream 43 is transmitted using standard modems and protocols.

Figure 5:
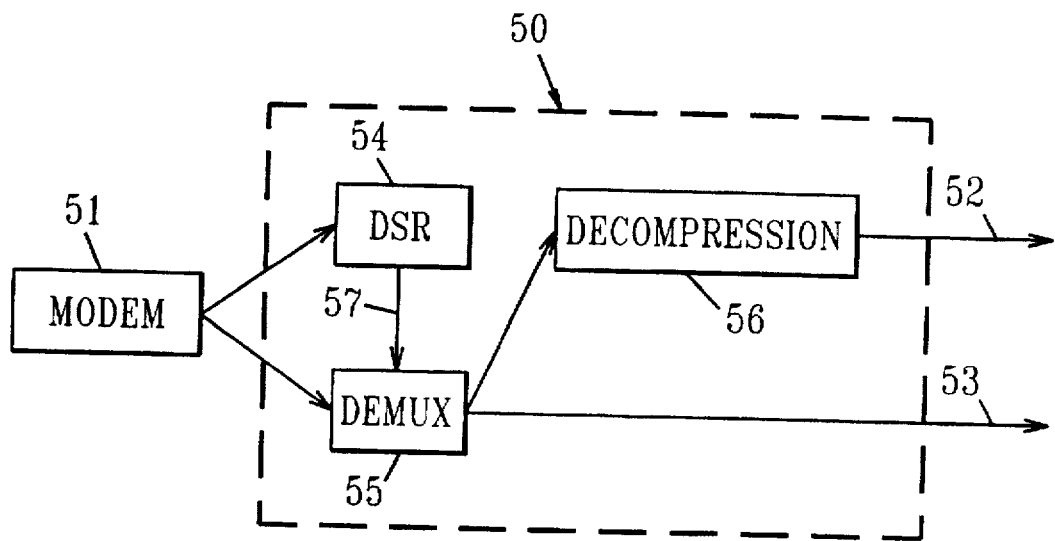
FIG. 5 shows a block diagram of a Periods of Silence Recognizer and Multiplexer on the receiver site according to the invention for the case of digital speech transmission.

At the receiver site, a computer based demultiplexing of the received data has to be accomplished. A software or an additional PC-card 50 is also supplied at the receiver site. The embodiment of that card 50 shown in FIG. 5 comprises an input port 51 for the transmitted signal received by a modem and two output ports 52, 53, the first transferring reconverted digital speech, the second transferring reconverted data. The input signal 51 is fed into a speech data recognition (SDR) 54 and a demultiplexor (DEMUX) 55 in parallel. The SDR 54 generates a control signal 57 for the DEMUX 55 which connects the input signal to output port 52 or output port 53. Further the extracted speech is decompressed and reconverted to the desired analog speech signal in a decompression unit 56.

The basic approach of the speech controlled data transfer modem can be generalized for other networks too, like e.g. GSM Standard Networks or ISDN. Use of the invention in a GSM network is very efficient in view of the relatively high bandwidth costs. For those kinds of networks an implementation of the transfer modem according to the invention is even easier because speech is already transmitted in a digitally coded format.

Figure 6:
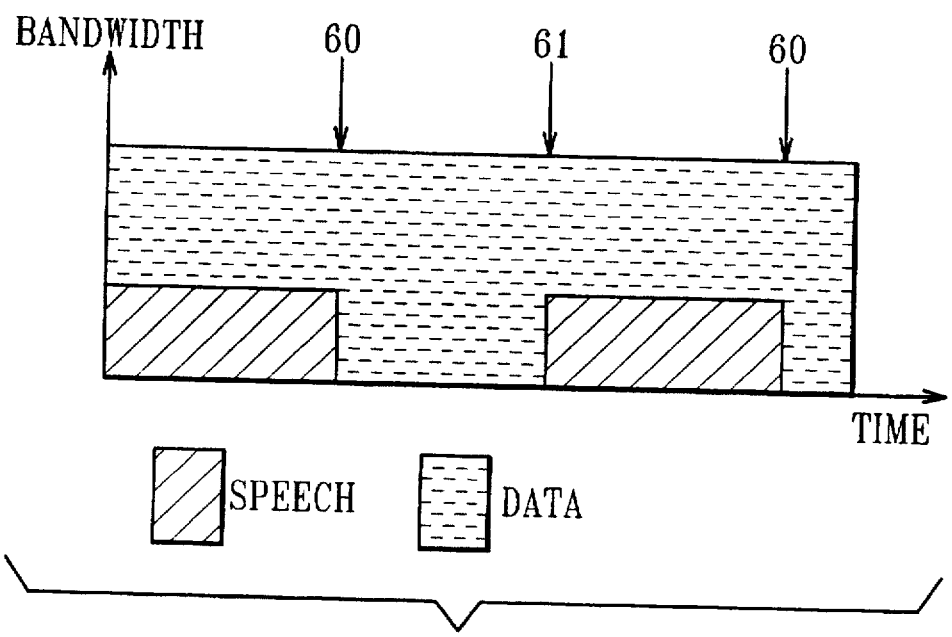
FIG. 6 shows a schematic drawing of an ISDN line illustrating the principle aspects of bandwidth sharing.

For ISDN with it's relatively high data rate, bandwidth saved by using compression techniques can be used for additional data transfer. This is illustrated in FIG. 6 by means of a diagram according to FIG. 1. In periods of silence, each starting at times 60, even the full bandwidth can be used for data transfer. In periods of speech transfer which start at times 61 a bandwidth sharing is fulfilled.

In a preferred embodiment of the invention the importance of streams i.e. the priorities of the streams are determined by a weighting function $$G_{norm}(s_i,t) = A(s_i) \left[ 1 + \frac{loud(s_i,A(s_i))}{loud_{max}} \right]$$

comprising the amplitude loud(si,t) of an audio substream and a parameter A(si) which describes the last time when a stream has been active. Herein the weighting function is only dependent on the corresponding audio substreams and the time.

Because active streams always have higher weights than passive streams, a weighting function G can be defined as G(si,t)=A(si) x loudmax+A(si) x loud(si,A(si)), where loud (s,t) describes the loudness of the audio substream of a stream s at time t and where loudmax is the maximum amplitude of the audio signal. A(si) describes the last time when a stream si was active. After normalization by dividing that expression by the maximal loudness formula (1) is got.

For each stream three different states can be defined regarding to the corresponding audio information:

1. A multimedia stream is currently active, if there is any corresponding audio signal detected, i.e. its amplitude is greater than a certain threshold nearby 0. For this case in the expression (1) is A(si)=t.
2. A multimedia stream is in a passive state, if there is no audio signal detected, i.e. the amplitude of the audio signal is lower than a certain threshold nearby 0. For that case in (1) A(si)=tk.
3. A multimedia stream has never been active. Then A(si)=0 is valid.

In this preferred embodiment multimedia streams are weighted based on the amplitude of the audio substream which means that the current speakers in a conferencing scenario are weighted based on the loudness of their audio signal. It is emphasized that there is no restriction of the invention to that kind of weighting mechanism. For example, the weighting function can be also based on a video or a mouse pointer signal, wherein motion activity of the participants or the position of a pointer are responsible for building up the scale of priorities.

Participants who have already finished speaking are weighted based on the time when they finished their last speaking.

In the general case, where the group is dynamic and where participants can join or leave the conference, the set of all multimedia streams is dependent on the time. Nevertheless, the method according to the invention can be applied to such a group of conference partners.

In a further embodiment of the invention the user beforehand can specify the maximum number nmax of streams which can be active in parallel. Only the information, e.g. video, audio, mouse pointer, foils, etc., of the actual m speakers, whose priority status has been set active, and the last nmax−m (nmax>=m) speakers is shown. For example, if there are more than one participants speaking in parallel, the loudest speakers are selected. The determination of the parameters n and m can be based on the systems or the telecommunication lines capacities and on the requirements of the users.

As a further embodiment the method according to the invention can be applied at the sender site or exclusively at the receiver site or at an intermediate control system.

Being applied at the sender site, information is sent only if there is any corresponding audio signal detected. This results in more user friendliness at the receiver site and allows to reduce the required bandwidth of the communication line which saves costs for the communication system. The improvement is almost linear to the number of participants of e.g. a video conference because in most video conferences only one—maybe two—person(s) is (are) speaking regardless of the number of participants.

Applying the proposed mechanism exclusively at the receiver site results in more user friendliness and a reduction of the required system resources at the receivers system.

By use of a dedicated conference control system all participants are sending video and audio information to an intermediate control system. This system is managing and distributing the information received. Decisions on what streams will be distributed in what quality. For example, are based on the weight of the stream.

Another subject-matter of the present invention is a speech controlled video conferencing system for transfer of video/audio/data multimedia streams via a telecommunication line which is based on the pre-described method. It comprises speech detection means for detecting the amplitudes of the audio substreams and for deciding which of the multimedia streams are set into the states active or passive, means for assigning each multimedia stream a priority for active transmission and setting up a scale of priorities for the priorities of the multimedia streams, means for dynamically changing the scale of priorities with regard to changes of the amplitudes of the audio substreams; and means for setting at least one multimedia stream into an active status for the transmission. For this system the above described aspects are also valid.

There are different approaches for speech controlled conferencing. Information, e.g. video, mouse pointer, foils, etc., is only displayed for streams with a high priority. In another approach windows or mouse pointers corresponding to streams with the highest priorities are marked or activated in order to help the user to concentrate on these parts of the user interface. If a user is working on a small screen with a lot of video and application windows on it, it can be helpful to display video information of active streams in color while video information of passive streams is displayed black and white.

In a preferred embodiment, the conferencing system according to the invention comprises generation means for generating a weighting function as above described. In systems where a loudness measurement function loud(s,t) is not available, a simplified version of the proposed weighting function can be used based only on a speech detection mechanism. Because a weighting among the active streams can not be supported without a loudness measurement function, loud(si,A(si)) is set equal to loudmax. The new weighting function is Gnorm(si,t)=2×A(si).

In a further embodiment the system comprises detection means for detecting the amplitude of the audio substreams and for setting multimedia streams into an active status whose audio substream exceeds a certain threshold for a defined time interval and detection means for detecting the periods of time for quiet audio substreams and for setting multimedia streams into a passive status whose audio substreams have been quiet for a time period longer than a certain threshold. The speech detection mechanism decides when to set a video/audio/data stream into the states active or passive.

If the amplitude of the audio signal exceeds a certain threshold for a defined time interval it is assumed that the user is speaking or interested in calling attention to himself and therewith this stream is set active. This mechanism reflects an observable human behavior in typical meetings and conferences. If there is no more audio information for a time period longer than a certain threshold the system assumes that the stream can be set passive.

Another subject-matter of the present invention is a speech controlled data transfer device for sharing the bandwidth of a single telecommunication line between speech and data streams.

Data transfer across the general switched telephone network (analog, ISDN and GSM) becomes more and more important, especially in the context of joint working applications and mobile office solutions i.e. personal assistants. These applications often require a direct interaction of the involved participants on two layers simultaneously: speech communication and data transfer.

Speech, as being the natural form of human communication, is an extremely efficient and absolutely necessary tool for very fast transmission of ideas and arguments. But, on the other hand, some kind of information can be transferred much more clearly by supporting speech by graphics. Furthermore, some special data, like e.g. business statistics, that are to be transferred during such a, normally speech based, telephone conference could be transmitted much more faster and surer using a binary format.

For joint working applications, where both teleconference participants are discussing a data object like e.g. a building plan and want to change it or to show some of it's elements by use of a virtual pointer, speech and data have to be transmitted in parallel.

In addition to lost effectiveness, when transmitting voice data only, lots of bandwidth are wasted during periods of silence. Because switched telephone networks provide full-duplex-connections only, periods of silence are really frequent because normally one of both channels stays unused, so that theoretically an additional data connection could be maintained in parallel.

Known solutions in this technical area are using special modems or interfaces which do not allow such a simultaneous transmission of speech and data. The user himself has to take the decision whether to transmit data or to maintain a speech oriented connection what is extremely inefficient in view of the new possibilities provided by joint working applications.

In particular, automatic switching techniques like the known silence suppression mechanisms are only used in switching nodes for digital time multiplexing of several telecommunication connections using a number of real physical connections inferior to the number of maintained connections. Silence suppression in this context means that periods of silence during a connection are detected and in case of detected silence the line is given to another connection of the network. If communication on the off-switched connection restarts, another free line, e.g. an unused line or a line already being in the silence suppression mode, has to be found.

Further, known solutions of the problem of simultaneity of speech and data transfer for easier communication, are establishing two connections via two separate telephone lines in parallel and manual or time multiplexed switching between a data modem and speech. The first approach supposes that two telephone lines are available in parallel. However, it is quite uneconomic because the user has to pay for two lines. But in most offices, especially in mobile offices, normally only one line is available. The second approach only requires one telephone line but is really uncomfortable. Both conference participants have to synchronize for switching and the data link has to rebuild after each speech interruption. Especially an effective simultaneous use of speech and data information is not possible.

It is therefore an object of the present invention to provide a transfer modem which allows for simultaneous transmission of speech and data in order to achieve an optimized bandwidth sharing without any interaction of the user(s). A further object is to maintain compability with currently used modems and transfer protocols, so that to be an addition to existing hard and/or software.

The data transfer device according to the invention comprises detection means for recognizing periods of silence of speech and multiplexer means for timely multiplexing data and speech with regard to periods of silence. The basic idea of this approach is an automatic time-multiplexing of data and speech using today's general switched telephone network, realizable with reasonable costs. The timeslots of this multiplexing are generated by an automatic periods of silence recognition. This proceeding allows data transfer during speechless moments.

The invention is applicable to ISDN- or GSM-Datacircuit-terminating equipment too.

In contrast with prior art solutions silence suppression is used at end nodes in order to share a single link between speech and data transmission. For speech communication, a conventional phone line is used. But during detected periods of silence, the line is switched automatically to the data connection.

In this approach compatibility with current used modems and transfer-protocols is achieved. The periods of silence recognizing and the multiplexing means can be disposed at the sender site and/or the receiver site.

In a preferred embodiment the speech controlled data transfer device comprises conversion means for a 2-wire to 4-wire conversion at a phone input and a modem input, period of silence recognition means and control signal generation means (PSR), recognition means for speech/data recognition of the incoming traffic (SDR) and switching means for a fast switching between phone input/output and modem input/output. An advantage of this approach is the non lossy speech transmission because of the analog signal transmission. Therefore, the user normally does not even realize the background data transmission.

Having thus described our invention, what we claim as new and desire to secure by Letters Patents is:

1. A method for transmitting multimedia streams via at least one telecommunication line, each multimedia stream having at least two substreams, with at least one of the substreams having an attribute for controlling the priority of at least one of the multimedia streams, the method comprising:
   a. continuously detecting changes in attributes of the substreams;
   b. providing a scale of priorities for the active transmission of the multimedia streams;
   c. dynamically changing the priority status of each multimedia stream according to the change of at least one of the attributes; and
   d. actively transmitting only those of the multimedia stream(s) with the highest priority level(s).

2. A method as recited in claim 1, wherein the priorities of the multimedia streams are determined by a weighting function $$G_{norm}(s_i,t) = A(s_i) \left[ 1 + \frac{\text{loud}(s_i, A(s_i))}{\text{loud}_{max}} \right],$$

wherein $\text{loud}(s_i, A(S_i))$ is the amplitude of an audio substream $s_i$ at time $A(s_i)$, where $A(s_i)$ indicates when the substream was previously active, where $A(s_i)$ is the the current time t if multimedia stream $s_i$ is currently active, where $A(s_i)$ equals zero if multimedia stream $s_i$ was never active, and where $A(s_i)$ equals $t_k$ if multimedia stream $s_i$ is currently in a passive state, where $t_k$ is the last time the multimedia stream $s_i$ was active and wherein $\text{loud}_{max}$ is the maximum amplitude of said substream.

3. A method as recited in claim 1, wherein a user selects the maximum number of streams which can be active in parallel.

4. A method as recited in claim 3, wherein said method is applied at a sender site, or at a receiver site, or at an intermediate control system.

5. A method as recited in claim 1, wherein said method is applied at a sender site, or at a receiver site, or at an intermediate control system.

6. A method as recited in claim 1, further comprising:
   a. detecting the amplitudes of the audio substream;
   b. setting each of the multimedia streams into either an active or passive state, where at least one of the multimedia streams is set in an active state for transmission;
   c. assigning to each multimedia stream a priority for active transmission; and
   d. dynamically changing the priority of each multimedia stream in response to changes in the amplitudes of the audio substream in each multimedia stream.

7. A method as recited in claim 6, wherein each priority assigned to each multimedia stream is determined by a weighting function $$G_{norm}(s_i,t) = A(s_i) \left[ 1 + \frac{\text{loud}(s_i, A(s_i))}{\text{loud}_{max}} \right],$$

wherein said $\text{loud}(s_i, A(s_i))$ is the amplitude of an audio substream $s_i$ and $A(s_i)$ indicates when said substream $s_i$ was previously active, where $A(s_i)$ is the the current time T if multimedia stream $s_i$ is currently active, where $A(s_i)$ equals zero if multimedia stream $s_i$ was never active, and where $A(s_i)$ equals $T_k$ if multimedia stream $s_i$ is currently in the passive state, where $T_k$ is the last time the multimedia stream $s_i$ was active and wherein $\text{loud}_{max}$ is the maximum amplitude of an audio signal.

8. A method as recited in claim 6, wherein each said multimedia stream is selected for the active state if the amplitude of its audio substream exceeds a first threshold in a prescribed time interval, and wherein each selected multimedia stream is selected for the passage state if the amplitude of its audio substream is below a second threshold for a time period longer than a selected minimum time period.

* * * * *